US008331610B2

(12) United States Patent
Lin et al.

(10) Patent No.: US 8,331,610 B2
(45) Date of Patent: Dec. 11, 2012

(54) METHOD FOR MEASUREMENT OF REFLECTANCE PROFILES OF IMAGE SURFACES

(75) Inventors: Julianna Lin, Rochester, NY (US); Aaron M Burry, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 869 days.

(21) Appl. No.: 12/471,826

(22) Filed: May 26, 2009

(65) Prior Publication Data

US 2010/0303280 A1 Dec. 2, 2010

(51) Int. Cl.
*G06K 9/00* (2006.01)
*G03G 15/00* (2006.01)

(52) U.S. Cl. .......................................... 382/100; 399/49

(58) Field of Classification Search .................. 382/100, 382/167, 173; 399/48, 49, 66, 71
See application file for complete search history.

(56) References Cited

U.S. PATENT DOCUMENTS

| | | | | |
|---|---|---|---|---|
| 5,342,715 | A * | 8/1994 | Kamath et al. | 399/130 |
| 6,036,298 | A * | 3/2000 | Walker | 347/19 |
| 7,120,369 | B2 | 10/2006 | Hamby | |
| 7,190,913 | B2 | 3/2007 | DiRubio | |
| 2002/0181964 | A1 * | 12/2002 | Campbell et al. | 399/49 |
| 2005/0088670 | A1 * | 4/2005 | Folkins | 358/1.4 |
| 2005/0196187 | A1 * | 9/2005 | Mizes et al. | 399/49 |
| 2005/0259866 | A1 * | 11/2005 | Jacobs et al. | 382/157 |
| 2006/0071963 | A1 * | 4/2006 | Sampath et al. | 347/19 |
| 2007/0070108 | A1 * | 3/2007 | Mantell et al. | 347/19 |
| 2008/0044190 | A1 * | 2/2008 | Silence | 399/27 |
| 2008/0137132 | A1 * | 6/2008 | Perronnin | 358/1.15 |
| 2009/0066987 | A1 * | 3/2009 | Inokuchi | 358/1.13 |

* cited by examiner

*Primary Examiner* — Yubin Hung

(57) ABSTRACT

A system of measuring the bare belt signature of a surface that does not require the use of extra print jobs, or extra belt cycles, during the printing of the actual print job. Instead, the inter-document zone and other "toner-free" areas within the test job itself are used to extract an estimate of the bare belt signature. More specifically, prior knowledge of the job content and of the location of the area between image pitches is used to identify areas of the belt that should be toner-free. These areas are then treated as "bare belt" segments, and the sensor signal for these areas are extracted, aligned according to their spatial location along the belt, and then averaged to produce a final estimate of the bare belt signature.

11 Claims, 2 Drawing Sheets

METHOD FOR MEASUREMENT OF REFLECTANCE PROFILES OF IMAGE SURFACES

BACKGROUND

1. Field of the Technology

The present disclosure is applicable to methods and systems of using reflective optical sensors to monitor very low densities of toner on various substrates within a print engine. More particularly, the present disclosure relates to process controls and system based on the amount of toner residual mass remaining on a substrate after various image transfer operations such as transfer of the image to another medium.

2. Description of the Prior Art

Xerographic process control systems often use reflective optical sensors to monitor the amount of toner present on various substrates or surfaces at different points during the printing process. For example, ETAC (Enhanced Toner Area Concentration) sensors and FWA (full-width array) sensors can be used to monitor the amount of toner present on an intermediate transfer belt (ITB) or on a photoreceptor (P/R) belt. While these sensors work well for detecting large amounts of toner—such as the developed mass before the $2^{nd}$ transfer system—careful calibration is required to make these sensors yield meaningful data for small amounts of toner, such as the residual mass left behind after the $2^{nd}$ transfer point. In particular, in order to accurately measure residual mass after $2^{nd}$ transfer, a careful measurement of the reflectance profile of the bare belt is required. The reason for this is that the measured reflectance signal is dominated by the reflectance profile of the bare substrate. The signal of interest is, in fact, the deviation from this bare-belt reflectance signal that is caused by the presence of the residual mass. Thus, without the bare belt signature, the data for the residual mass can not be adjusted correctly to extract the true signal, and an erroneous mass reading would result. Although the main context for this invention is the measurement of low toner masses (e.g., residual mass), the methodology is still applicable to higher toner masses (e.g., developed mass). This is because the typical algorithm for calculating developed mass actually compares the sensor's data signal to the bare belt signature (the essence of the present invention). The improvement in accuracy in this case, may be smaller, however, the same techniques of the present invention apply.

Currently, the most common method for measuring the bare belt signature is to print a blank job containing 10 or 20 pages (which would correspond to multiple revolutions of the belt loop), while monitoring the output of the optical sensor. The data is then averaged point by point across the multiple belt revolutions to reduce the noise in the signal. This produces a mean once-around bare belt signature. Alternatively, if the capability exists, the belt substrate could be rotated alone, without the need to feed extra paper through the printer. However, this does not change the amount of time that would be needed to perform this measurement. Furthermore, when executing a large set of print jobs, the belt signature will need to be re-measured periodically to take into account drifts in temperature, drifts in sensor parameters (e.g., changes in the illumination source), filming of the belt, and other systematic shifts in the process under test. This type of bare belt signature drift on the resultant measured residual mass signal has been demonstrated. An "out of date" bare belt signature can have a significant effect on the measurement of residual toner mass.

This requirement for frequent recalibration of the bare belt signature results in an even larger number of wasted pages and/or belt cycles, and (more importantly) wasted time, making the calibration process very time-consuming for actual product-intent control systems. A rough estimate for some machines or systems is that a re-calibration of the bare belt signature would be needed every 100-200 pages. Assuming that 10 pages are used for the calibration process, this would represent a 5-10% drop in productivity.

Thus, in accordance with the present invention, a faster (no extra belt cycles) and potentially more accurate measurement than previous methods is achieved. This is because the reflectance profile of the xerographic image surface is measured during the sensing time period itself, as opposed to being measured before or after the sensing period. This significantly reduces the time required for the reflectance profile measurement, as well as eliminating the time lag problem that exists in other methods for performing this measurement. In addition, unlike other methods, this technique does not require the use of a custom print target, such as the one described, for example, by Hamby et al. in U.S. Pat. No. 7,120,369.

These advantages allow the bare belt signature to be re-measured on a regular basis, which greatly improves the measurement accuracy of the sensor, particularly for low densities of toner. This is especially useful for performing in-situ measurements of residual mass on customer print jobs, which may in turn lead to better process controls and better image quality in the final prints.

SUMMARY OF DISCLOSURE

According to the embodiments of the present disclosure, there is provided an improved method and system of measuring the bare belt signature that does not require the use of extra print jobs, or extra belt cycles during the printing of the actual print job. Instead, the inter-document zone and other "toner-free" areas within the test job itself are used to extract an estimate of the bare belt signature. More specifically, prior knowledge of the job content and of the location of the area between image pitches is used to identify areas of the belt that should be toner-free. These areas are then treated as "bare belt" segments, and the sensor signal for these areas are extracted, aligned according to their spatial location along the belt, and then averaged to produce a final estimate of the bare belt signature.

BRIEF DESCRIPTION OF THE DRAWINGS

The above described features and advantages of the present disclosure will be more fully appreciated with reference to the detailed description and appended figures in which.

DETAILED DESCRIPTION OF DISCLOSURE

In accordance with the present invention, there is a system of measuring the bare belt signature that does not require the use of extra print jobs, or extra belt cycles during the printing of the actual print job. Instead, the inter-document zone and other "toner-free" areas within the test job itself are used to extract an estimate of the bare belt signature. In general, this system includes toner sensor data collection, storing the data in temporary memory, identifying the toner-free areas (using a page sync signal as a reference), aligning data according to spatial location along a belt (using a belt once around signal as a reference), extracting data corresponding to toner-free zones, calculating (or updating) a bare belt signature estimate, and storing the bare belt estimate in memory.

Figure 1:
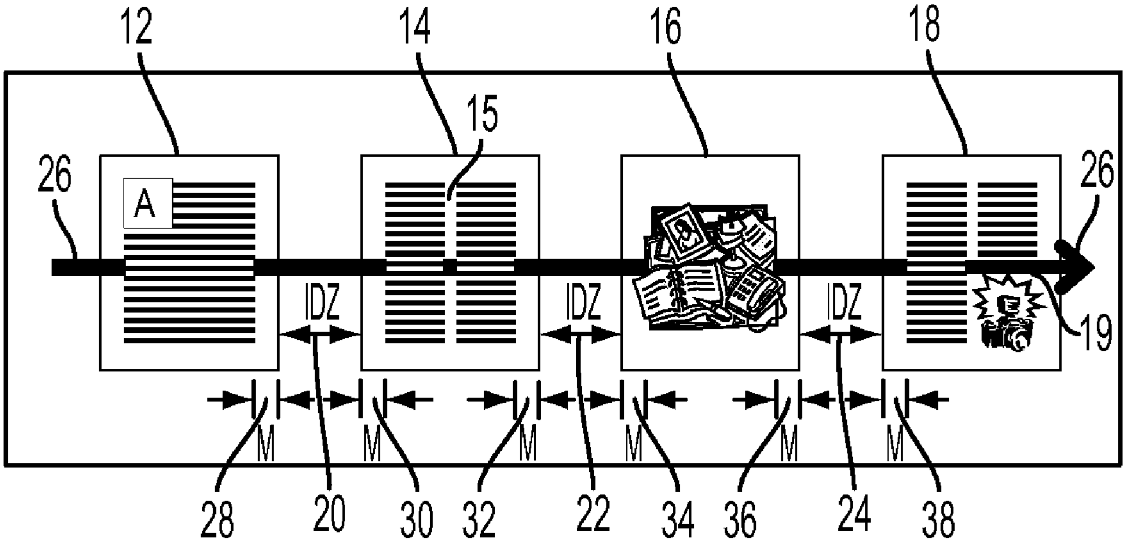
FIG. 1 depicts a sample job with the "toner-free" zones as seen by a reflective optical sensor in accordance with the present invention.

In a typical print job, the surface of a xerographic surface (such as the photoreceptor belt, intermediate transfer belt, etc.) is not completely covered with toner. Instead, there are typically a number of "bare" areas that are toner-free, such as the inter-document zone (IDZ) between image pitches, and the page margins at the edge of each image. FIG. 1 illustrates a sample document job with the "toner-free" zones (as seen by a reflective optical sensor). Two types of toner-free zones include the inter-document zone (IDZ) and the left and right page margins (M). A third type would be the print areas within each page that should be nominally blank, e.g., the space between the two columns of text on the second page, and the space above the picture on the fourth page. In addition, knowledge of the actual image content can be used to identify other areas within the customer job that are toner-free.

Specifically, with reference to FIG. 1, there are shown four pages, 12, 14, 16, and 18 imaged on a photoreceptor belt with inter-document zones 20, 22, and 24 between them. Also, shown are page margins 28, 30, 32, 34, 36, and 38 as toner free areas, and the space 15 on page 14 between the two columns on the page and a toner free space 19 on page 18 between the right column text and the graphic beneath the text. The arrow 26 extending through the pages is a frame of reference for the data illustrated in FIG. 2 of the types of toner free areas that can be recognized in accordance with the present invention.

Figure 2:
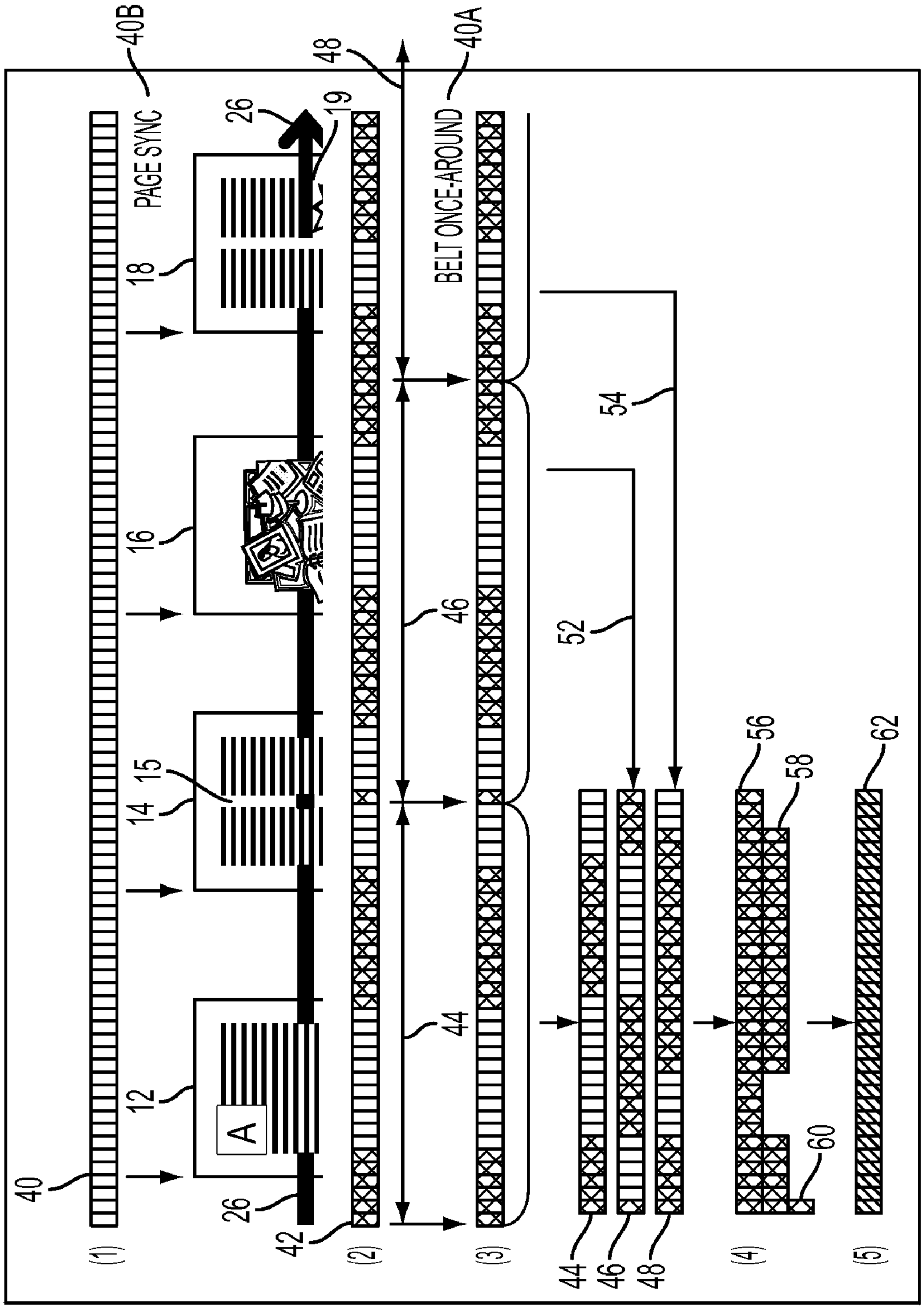
FIG. 2 illustrates a process, in accordance with the present invention, of taking advantage of the "toner-free" zones within a print job to extract an estimate of the bare belt signature.

As illustrated with reference to FIG. 2, there is shown, in detail, the process of taking advantage of the "toner-free" zones within a print job to extract an estimate of the bare belt signature or signal representing that portion of the belt surface that is toner free. This eliminates using extra print jobs or extra belt cycles to perform this measurement. After calibration of a reflective optical sensor, an example of this process is illustrated with respect to the five steps that are shown as follows.

In step 1, as generally shown at 40, the customer's print job is sent to a printer and the toner area concentration is monitored and data collected using the optical sensor. A once-around signal 40A for the belt surface (e.g., the machine's belt-hole signal) is also monitored and recorded. In addition, the machine's page sync signal 40B is also monitored and recorded as will be explained further.

In step 2, using the page-sync signal 40B as a guide, each data value in the raw sensor signal is identified, as illustrated at 42, as either belonging to the imaged area, the white portions of the data in the figure, or belonging to the non-imaged area, the crosshatched portions of the data (i.e., bare) area of the belt surface in the figure. This "flag" data can be stored in a second data structure or memory of the same size as the original data array.

In step 3, using the belt once-around signal 40A as a guide, the sensor data (including the flag or bare area data) is split into segments, with each segment corresponding to one revolution of the belt. As shown in FIG. 2, there are three segments shown at 44, 46, and 48. The data points within each segment are then aligned according to spatial location along the length of the belt. That is, the data points within each segment are numbered according to their estimated distance along the length of the belt. As illustrated, segment 46 is demonstrated to be aligned with segment 44 by arrow 52 and segment 48 to be aligned with segments 44 and 46 by arrow 54.

In step 4, using the flag data as a guide, the data points from only the non-imaged areas of the belt surface are extracted, and aligned according to their corresponding location along the belt. This aligned toner-free only data is illustrated by rows 56, 58, and 60.

In step 5, the data from step 4 is used to create an estimate of the bare belt signature, as demonstrated by row 62. A simple approach to estimate this bare belt signature could be to use the average of the data points at each spatial location to re-create the bare belt signature. A more complicated approach would be to use a sequential least squares estimate to fit the fundamental frequency of the belt signature (i.e., 1/T, where T is the period of the belt revolution), plus 20 of the higher harmonics of this frequency. Note that while the latter approach would yield a much smoother estimate of the bare belt signature, this comes at the expense of a much more computationally intense calculation and longer calculation times.

Note: Although the concepts illustrated in steps 1-5 can be performed at the end of the print job (i.e., after all the data has been collected), the concepts can also be performed during the print job itself, using a sliding window of data points. In other words, after enough data has been collected from the bare surfaces during the print job to be able to make an estimate, a new bare signature could be determined and become a new bare surface estimate. Such data collection points could be based upon events such as a set number of completed printed pages. A sliding window would allow the bare belt signature to track the belt drift more closely, as well as enable sensor readings to be used as feedback for real-time control systems.

It should also be noted that in some systems putting images on the seam of the photosensitive belt is immaterial whereas in other systems it is necessary to avoid placement of an image on the seam of the photosensitive belt. In those systems having a belt that permits an image anywhere on the belt without concern for a seam, the location of the image pitches on the ITB tend not to be synchronized with the belt once-around signal. As a result, it can be easier to find bare belt data for each belt location, since the IDZ tends to drift along the belt's surface. On the other hand, for belt systems where the image pitches are synchronous with the belt, that is are not placed on the seam, the images will occur in exactly the same location on the belt for every belt revolution and the IDZs will not drift. In this situation, another approach might be to characterize the full belt signature once during the cycle-up process, and then identify toner-free areas during the print job (e.g., IDZ, page margins, blank areas in the customer image, skipped pitches, etc.) where the sensor values could be used to adjust the estimate of the bare belt signature.

Although this methodology was described primarily for a single point sensor, this technique could be extended very easily to an array of point sensors, or a full-width array (FWA), or a CCD camera, or any other type of 1-D or 2-D optical detector array. In addition, the technique could be applied to other types of sensors, such as an ESV, which also rely on the measurement of a "bare" (e.g., uncharged) surface as a baseline for their measurement technique. Furthermore, the technique could even be applied to images of toner on paper (rather than toner on a xerographic surface), where the technique could be used to identify blank areas of the paper which are then extracted to generate an estimate of the flat-field data for the image sensor. Also, this technique could also be applied to a drum-like surface (or any other surface that is rotated underneath a sensor). It should also be noted that the present invention applies to various print colorants such as toner and ink and also to various printer techniques such a xerography and ink jet printers.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. In printing a document job, the document job including placing images on a surface, a method of measuring a bare surface signature of the surface within a print engine including the steps of:

defining image colorant free zones on the surface, including the step of responding to the content of images and the location of zones between images to identify image colorant free zones, determining the locations of the image colorant free zones along the surface, including the step of treating the image colorant free zones of the surface as bare surface zones, providing image colorant density signals along the surface with said images placed, extracting the image colorant density signals of the image colorant free zones along the surface according to the locations, and providing the bare belt signature of the image colorant free zones in response to the extracted image colorant density signals of the image colorant free zones.

2. The method of claim 1 including the step of providing the bare surface signature at the completion of said document job.

3. The method of claim 1 wherein the step of providing image colorant density signals along the surface is continuous during operation of the printer and the step of providing the bare surface signature of the image colorant free zones along the surface occurs at predetermined intervals.

4. The method of claim 3 wherein a predetermined interval is based upon collection of a predetermined amount of image colorant density signals.

5. The method of claim 3 wherein a predetermined interval is based upon printing a predetermined number of pages of said document job.

6. A method for monitoring image colorant characteristics in a printing system including the steps of:

collecting image colorant density data of a surface placed with images from a sensor, identifying image colorant free areas along the surface, including the step of identifying image colorant free areas within an image placed on said surface, extracting values of the identified image colorant free areas from the collected data, and estimating an image colorant signal from the extracted values.

7. The method of claim 6 including the step of aligning segments of the image colorant density data according to spatial location along the surface.

8. The method of claim 6 wherein the printing system is an ink jet printing system and the step of collecting colorant data includes the step of collecting ink density data.

9. A method of determining a bare surface signature of a surface in a printing system comprising the steps of:

defining image colorant free areas of a document job, including zones between images when placed on a surface and selected zones within the mages when placed on the surface, sensing image colorant density data from the surface placed with said images, extracting data for the image colorant free areas from the sensed image colorant density data, and estimating a bare surface signature from the data for the image colorant free areas.

10. The method of claim 9 wherein the step of sensing image colorant density data from the surface includes the step of aligning segments of the image colorant density data according to spatial location along the surface.

11. The method of claim 10 wherein the step of estimating a bare surface signature from the data for the image colorant free areas includes the step of averaging the data for the image colorant free areas according to said aligning to produce an estimate of the bare surface signature.

* * * * *